United States Patent
Abd Elhamid et al.

(10) Patent No.: US 7,749,631 B2
(45) Date of Patent: Jul. 6, 2010

(54) FUEL CELL SEPARATOR PLATE COATING

(75) Inventors: Mahmoud H. Abd Elhamid, Grosse Pointe Woods, MI (US); Gayatri Vyas, Rochester Hills, MI (US); Thomas A. Trabold, Pittsford, NY (US); Youssef M. Mikhail, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1396 days.

(21) Appl. No.: 11/142,583

(22) Filed: Jun. 1, 2005

(65) Prior Publication Data

US 2006/0275643 A1 Dec. 7, 2006

(51) Int. Cl.
H01M 2/00 (2006.01)
H01M 2/14 (2006.01)

(52) U.S. Cl. .......................................... 429/34; 429/38

(58) Field of Classification Search .................. 429/34, 429/38; 427/115
See application file for complete search history.

(56) References Cited

U.S. PATENT DOCUMENTS

| | | | |
|---|---|---|---|
| 5,641,586 A | 6/1997 | Wilson | |
| 6,030,718 A | 2/2000 | Fuglevand et al. | |
| 6,733,911 B2 | 5/2004 | Kawahara | |
| 2006/0099481 A1* | 5/2006 | Ji et al. | 429/38 |
| 2006/0286429 A1* | 12/2006 | Shiepe et al. | 429/38 |

FOREIGN PATENT DOCUMENTS

| | | |
|---|---|---|
| CA | 2 334 630 | 6/1999 |
| JP | 2002-231262 | 8/2002 |
| JP | 2005-005137 | 1/2005 |
| WO | WO 02/27846 A2 | 4/2002 |

* cited by examiner

*Primary Examiner*—Patrick Ryan
*Assistant Examiner*—Muhammad Siddiquee
(74) *Attorney, Agent, or Firm*—Harness, Dickey & Pierce P.L.C.

(57) ABSTRACT

A fuel cell electroconductive element, or bipolar plate, that includes a substrate with a cationic or anionic exchange resin coating deposited thereon, and a method for making the same. The bipolar plate has a fluid flow field formed therein. The ion-exchange polymer is preferably deposited on a region of the surface of the substrate by a process of dip coating or spraying. The resin coating is substantially hydrophobic in nature when dry and substantially hydrophilic when wet.

14 Claims, 3 Drawing Sheets

FUEL CELL SEPARATOR PLATE COATING

FIELD OF THE INVENTION

The present invention relates to fuel cell separator plates, and more particularly to separator plate coatings.

BACKGROUND OF THE INVENTION

Electrochemical cells, such as fuel cells, generate electrical power through the electrochemical reaction of a fuel and an oxidant. An exemplary fuel cell has a membrane electrode assembly (MEA) with catalytic electrodes and a proton exchange membrane (PEM) sandwiched between the electrodes. In preferred PEM type fuel cells, hydrogen is supplied as a reductant to an anode and oxygen is supplied as an oxidant to a cathode. PEM fuel cells reduce oxygen at the cathodes and generate an energy supply for various applications, including vehicles.

It is well established that channel water accumulation, in both the anode and cathode flow field plates, significantly influences fuel cell performance at low loads. When the gas velocities are relatively low (i.e., less than about 5 meters per second), the water transported through channels of diffusion media favors the formation of liquid droplets that occupy a significant portion of the channel cross-section. These droplets increase the gas flow resistance in particular channels, thereby diverting flow to neighboring channels and essentially starving the local active area of necessary reactants. Various means of circumventing this potential problem have been explored and have included altering the physical characteristics of the channels, including the channel geometry, specifically the size and shape. There remains a need for improved water management to improve fuel cell performance, efficiency, and lifespan.

SUMMARY OF THE INVENTION

The present invention provides a fuel cell flow field plate including a substrate having a surface constructed and arranged to distribute a reactant gas. At least one region of the surface comprises a polymeric or resin coating. In certain embodiments, the resin coating preferably comprises an ion-exchange resin that is substantially hydrophobic in nature when dry and substantially hydrophilic in nature when wet. In preferred aspects, the resin comprises a perfluorosulfonic acid polymer. In various embodiments, the resin coating has a thickness from about 0.01 to about 10 μm.

In another embodiment, the present invention provides a fuel cell comprising an anode, a cathode, a proton exchange membrane disposed between the anode and the cathode, and at least one flow field plate disposed adjacent to one or both of the anode and cathode. The flow field plate comprises an ion-exchange resin coating, the resin coating being substantially hydrophobic when dry and substantially hydrophilic when wet.

The present invention also provides a method for managing the water accumulation in a fuel cell. The method comprises depositing an ion-exchange resin coating on at least one region of a flow field of an electrically conductive element, the resin coating being substantially hydrophobic when dry and substantially hydrophilic when wet. Various embodiments include dip coating or spraying the resin coating onto select regions of electrically conductive fuel cell elements (or bipolar plates).

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In order to achieve stable PEM fuel cell operation over a wide range of loads, it is necessary to properly manage fluid flow, and more particularly liquid flow, in a fuel cell. For example, liquid water is produced by the cathodic oxygen reduction reaction that occurs during operation of an electrochemical fuel cell and should be effectively circulated and/or removed to maintain stable reactions. Liquid accumulation as described herein is, in essence, a pooling of liquid water formed primarily at the cathode. Key factors related to fuel cell operation are water transportation and preventing undesired accumulation of water in a fuel cell. Thus, the ability to expel water from flow field channels at various levels of gas velocities and operating conditions is important to fuel cell operations. To address such issues, the present invention contemplates the use of an electrically conductive flow field separator plate having dual-nature water handling properties. The flow field is coated with an organic polymer having ion-exchange activity, such as cation or anion exchange resins, or both, that are substantially hydrophobic in nature when dry, and substantially hydrophilic in nature when wet. This dual-nature coating improves fuel cell operation by favoring the formation of thin water films, thereby minimizing resistance to reactant gas flows and maintaining stable performance at low gas velocities.

Figure 1:
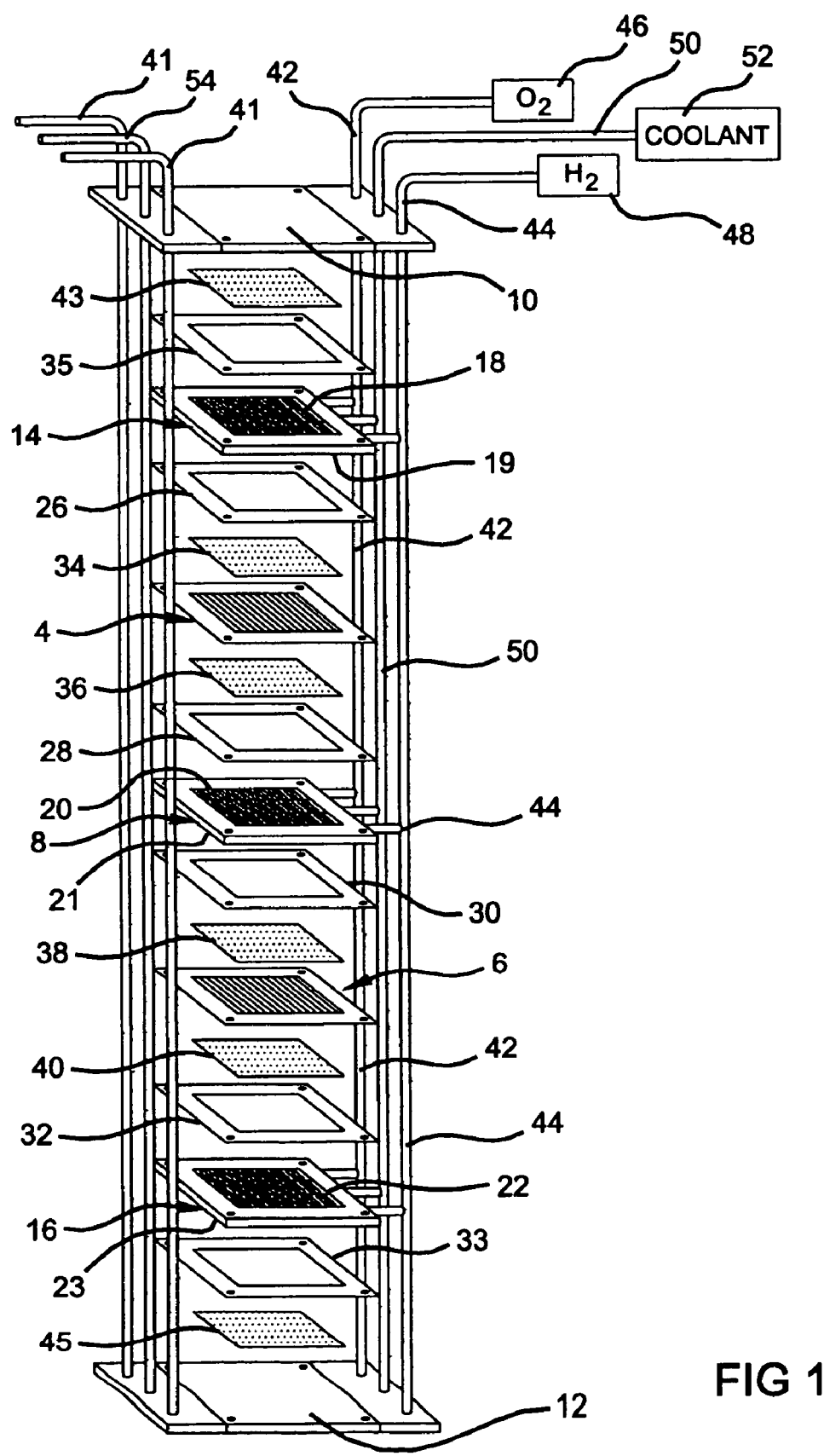
FIG. 1 is a schematic, exploded, isometric illustration of an exemplary liquid-cooled PEM fuel cell stack (only two cells shown)

To gain a better understanding of the present invention, an exemplary fuel cell employing the present invention is shown in FIG. 1, which depicts two individual proton exchange membrane (PEM) fuel cells connected to form a stack having a pair of membrane electrode assemblies (MEAs) 4, 6 and gas diffusion media 34, 36, 38, 40 separated from each other by an electrically conductive, liquid cooled, bipolar separator plate or conductive element 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so-called separator, or "bipolar" plate. The fuel cell stack is described herein as having conductive bipolar plates.

The MEAs 4, 6 and bipolar plate 8 are stacked together between stainless steel clamping terminal plates 10, 12 and end contact fluid distribution elements 14, 16. The end fluid distribution elements 14, 16, as well as both working faces or sides 20, 21 of the bipolar plate 8, contain a plurality of lands adjacent to grooves or channels on the active faces 18, 19, 20, 21, 22, and 23 for distributing fuel and oxidant gases (e.g., $H_2$ and $O_2$) to the MEAs 4, 6. Nonconductive gaskets or seals 26, 28, 30, 32, 33, and 35 provide a seal and electrical insulation between the several components of the fuel cell stack. Gas permeable conductive diffusion media 34, 36, 38, and 40 press up against the electrode faces of the MEAs 4, 6. Additional layers of conductive media 43, 45 are placed between the end contact fluid distribution elements 14, 16 and the terminal collector plates 10, 12 to provide a conductive pathway therebetween when the stack is compressed during normal operating conditions. The end contact fluid distribution elements 14, 16 press up against the diffusion media 34, 43 and 40, 45 respectively.

Oxygen or another oxidant gas is supplied to the cathode side of the fuel cell stack from storage tank 46 via appropriate supply plumbing 42, while hydrogen or another fuel gas is supplied to the anode side of the fuel cell from storage tank 48 via appropriate supply plumbing 44. Alternatively, air may be supplied to the cathode side from the ambient and hydrogen to the anode from a methanol, methane or gasoline reformer, or the like. Exhaust plumbing 41 for both the $H_2$—$O_2$/air sides of the MEAs is also provided. Additional plumbing 50 is provided for circulating coolant from a storage area 52 through the bipolar plate 8 and end plates 14, 16 and out the exit plumbing 54.

During fuel cell operation, the anode hydrogen gas ($H_2$) is split into two protons ($H^+$), thus freeing two electrons. The protons migrate across the membrane of the MEA 4, 6 to the cathode side. The oxygen or air introduced at the cathode side flows into the porous electrode. Catalyst particles within the cathode facilitate a reaction between the protons ($H^+$) and oxygen ($O_2$), to form water within the electrode. Thus, as liquid water is generated, the gas flow into the porous cathode material must simultaneously be maintained. Otherwise the electrode has the potential to "flood" with liquid. Flooding impedes gas flow to the PEM through the MEA 4, 6 in effect decreasing or ceasing any reactions occurring at the MEA 4, 6. A preferred embodiment of the present invention provides the fluid distribution means adjacent to the cathode that facilitates water and cathode effluent transportation away from the cathode, while further humidifying the PEM, and, in some embodiments, even cooling the fuel cell.

As recognized by one skilled in the art, the bipolar plates of the present invention may vary in design, such as, for example, in the configuration of the flow fields, placement, and number of fluid delivery manifolds, and the coolant circulation system. However, the function of conductance of electrical current through the surface and body of the bipolar plates function similarly with all designs. In various embodiments, the bipolar plates comprise a composite material, such as a carbon composite material. In other embodiments, a neutralized form of an ion-exchange resin can be coated over metallic bipolar plates such as stainless steel, aluminum, magnesium, titanium, or their alloys. The bipolar plate may include an electrically non-conductive base plate having an electrically conductive layer on the reactant surface, where the electrically conductive layer is in communication with other electrically conductive layers across a fuel cell stack.

Figure 2:
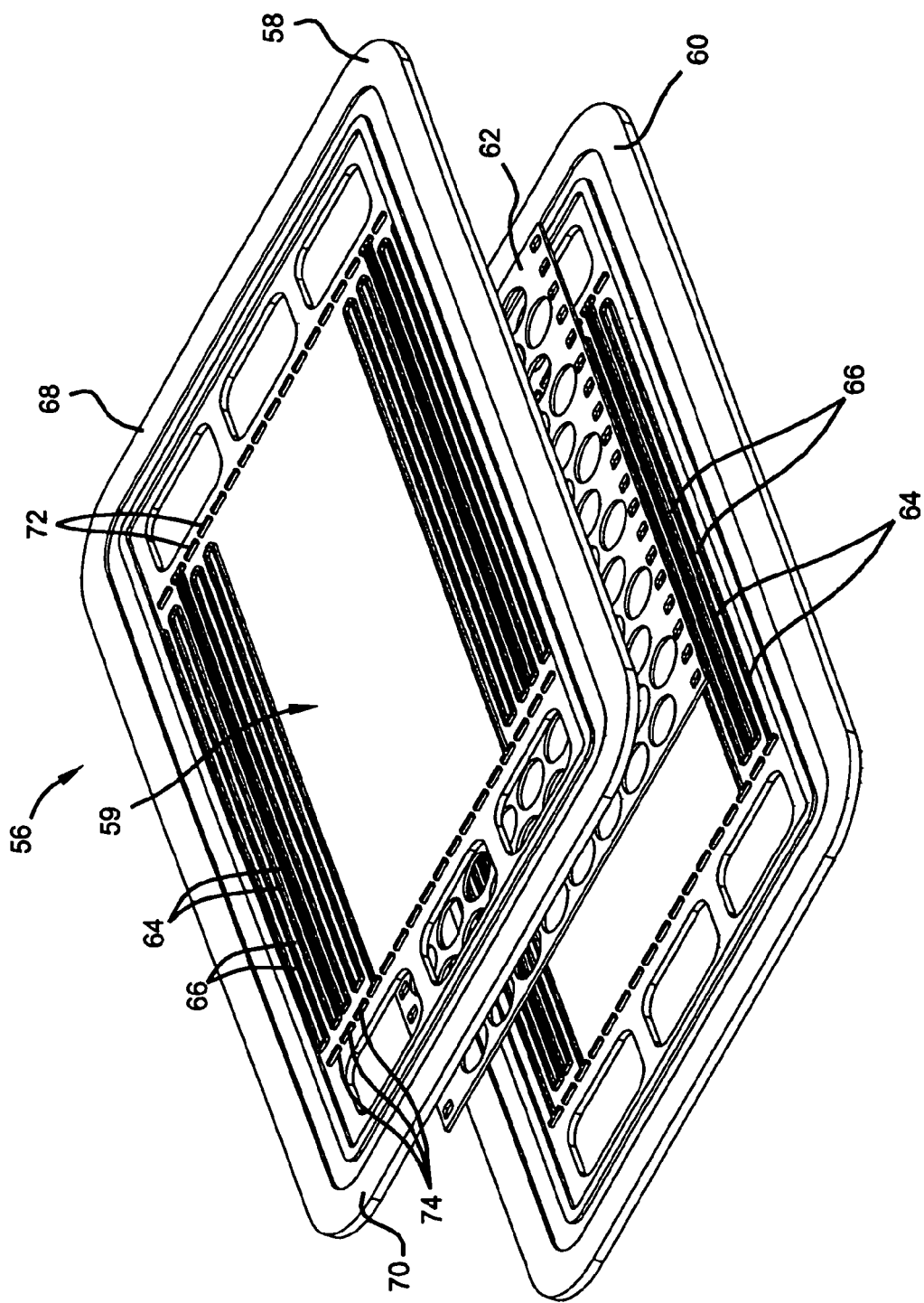
FIG. 2 is an exploded, isometric view of a bipolar plate useful with PEM fuel cell stacks as illustrated in FIG. 1.

FIG. 2 is an isometric, exploded view of a bipolar plate 56 comprising a first exterior separator sheet 58, a second exterior separator sheet 60, and an interior spacer sheet 62 interjacent the first sheet 58 and the second sheet 60. It should be understood that, in certain embodiments, the bipolar plate may be unitary or monolithic. The exterior separator sheets 58, 60, if metallic, are preferably very thin (e.g., about 0.002-0.02 inches thick), and may be formed by stamping, by photo etching (i.e., through a photolithographic mask), or any other conventional process for shaping sheet metal. The external sheets 58, 60 each have working surfaces 59 on the outside thereof that confront a membrane-electrode-assembly (not shown) and are formed with a plurality of lands 64 that define therebetween a plurality of grooves 66 known as a "flow field" through which the fuel cell's reactant gases (e.g., $H_2$ or $O_2$) flow in a tortuous path from one side 68 of the bipolar plate to the other side 70. When the fuel cell is fully assembled, the lands 64 press against carbon/graphite paper gas diffusion media, (such as 36 or 38 in FIG. 1), which, in turn, press against the MEAs (such as 4 or 6 in FIG. 1, respectively). For drafting simplicity, FIG. 2 depicts only two arrays of lands 64 and grooves 66. In reality, the lands and grooves 64, 66 will cover the entire external surfaces of the separator sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

The electroconductive element, or separator plate comprises a surface having a fluid flow field formed therein, and an ion-exchange resin coating applied along a region of the flow field. The term "electroconductive" as used herein is a relative shorthand term used in the art to designate electrically conductive. The resin coating according to the present invention reduces liquid accumulation on the coated region as fluid flows through the flow field, as compared to liquid accumulation over an uncoated region of the surface.

Ion-exchange resins are classified in the art by physical and chemical characteristics of a polymeric matrix and a functional group. Functional groups serve as active, fixed sites where a reversible chemical exchange can occur with charged mobile ions. Mobile counterions are present and provide suitable electroneutrality. Common ion-exchange resins comprise a cross-linked polymer matrix with a substantially uniform distribution of ion active sites throughout the matrix structure. Typically, the polymerization conditions of the backbone polymer determine the structure and porosity of the ion-exchange resin. The porosity influences the size of the ions or charged molecules that may enter a specific structure, and also influences the rate of diffusion. The fixed ionic groups determine the ion-exchange properties. For example, cation exchange resins possess a negatively charged matrix with exchangeable positive ions, or cations, such as for example $H^+$, $Ca^+$, $Na^+$, $NH_4^+$, etc. Useful cation exchange resins include both strong and weak acid resins. Strong acid resins commonly comprise sulfonic acid groups attached to a styrenic backbone, while weak resins are generally derived from acrylic acid polymers and comprise carboxylic acid derivatives. Anion exchange resins possess a positively charged matrix with exchangeable negative ions, or anions, such as for example, $HCO^{3-}$, $OH^-$, $Cl^-$, $SO_4^{2-}$, etc. Likewise, the anion exchange resins can include both strong and weak functionalities. As is known in the art, resins based on weak acids and weak bases generally exhibit a higher exchange capacity than resins based on strong acids and bases. Common resin matrices include styrene-divinylbenzene copolymer (gel and macroporous), polystyrene, polyethylene, and polypropylene. Non-limiting examples of preferred ion-exchange resins for use with the present invention include poly (perfluorosulfonic acid) (PFSA), and resins having PTFE backbones, such as perfluourosulfonic acid/TFE copolymer in the acid form ($H^+$).

In various embodiments, the resin coating exhibits a substantially hydrophobic character in a dry environment. As used herein, a "dry" environment is defined as an environment when the Local Relative Humidity (LRH) is less than 100%, often less than 90% LRH, and even less than 70-80% LRH, or lower. "Hydrophobic," as used herein, is a relative material characteristic as compared to a reference material, and more particularly pertains to a surface property where the surface has a diminished propensity to accumulate or attract liquids. Thus, hydrophobic surfaces generally have lower surface free energies, higher water contact angles, or both, as compared to a reference surface. Generally, a surface is considered to be hydrophobic if it exhibits a static water contact angle of greater than 90°. In this manner, the present invention provides an ability to manipulate the surface properties of a flow field by applying the resin coating to select regions of the flow field, thereby improving water transport and management and improving the fuel cell performance, compared to an element not having the water management resin coating applied. In preferred embodiments of the present invention, the resin coating comprises an ion-exchange resin which preferably increases the hydrophobicity (e.g., decreases the surface energy) of the coated region during dry conditions when compared to an uncoated and/or untreated region of the flow field.

In various embodiments, the resin coating exhibits a substantially hydrophilic character in a wet environment. As used herein, a "wet" environment is defined as an environment when the LRH is greater than 100%. "Hydrophilic," as used herein, is a relative material characteristic as compared to a reference material, and more particularly pertains to a surface property where water spreads easily on the surface. Thus, hydrophilic surfaces generally have higher surface free energies, lower water contact angles, or both, as compared to a reference surface. Generally, a surface is considered to be hydrophilic if it exhibits a static water contact angle less than 90°. In this manner, the present invention provides an ability to manipulate the surface properties of the flow field by applying the resin coating to select regions of the flow field, thereby minimizing and/or preventing the formation of water droplets that may block the gas flow channels. This results in improved fuel cell performance, compared to an element not having the water management resin coating applied. In preferred embodiments of the present invention, the resin coating comprises an ion-exchange resin that preferably increases the hydrophilicity (e.g., increases the surface energy) of the coated region during wet conditions when compared to an uncoated and/or untreated region of the flow field.

The wettability of a surface is categorized by the measurement of the static water contact angle, or the angle formed at the contact line between a liquid drop and a surface. As previously discussed, for contact angles less than 90°, a surface is considered hydrophilic, and for those greater than 90°, hydrophobic. Likewise, the wetting angle of a non-wetting fluid is generally greater than 90°. The wetting angle of a wetting fluid is generally between 0 and 90°. One benefit of hydrophilicity in management of liquid water is best realized for wetting angles that are low enough to support spontaneous capillary flow (i.e., "imbibition") of water into the channels of the flow field. For channels that are of approximately square or rectangular cross-sectional geometry, the wetting angle is preferably from 0 to about 45°, and more preferably from 0 to about 30°.

The present invention thus provides a method for modifying the surface free energy and/or changing the hydrophobic/hydrophilic nature of regions of electroconductive elements (e.g. bipolar plates) by applying an ion-exchange resin onto select regions of the elements. In terms of cost, time, and complication, preferred methods of applying the resin coating onto the electroconductive element include dip coating and spraying methods known in the art. Using any appropriate method, the resin coating is deposited on a region of the surface of the element, for example as a thin film (e.g., less than 10 µm) coated on one or more select regions. In various embodiments, it may be desirable to coat the entire surface of the element. In various other embodiments, it may be desired to coat the flow channels 66 and not the lands 64. In these situations, the coating can be removed from certain areas, or the element may be masked in certain areas prior to being coated using conventional means.

It has been found that an increase in the contact resistance between the bipolar plate and the diffusion media is limited by applying a very thin (e.g., less than 100 nm) continuous layer, or by controlling the application process such that a discontinuous layer is formed. In preferred embodiments, a thickness of the resin coating may range from about 0.01 to about 10 µm; more preferably the resin coating is from about 0.05 to about 5 µm, and even more preferably from about 1 to about 2 µm. The coating may comprise one or more layers to achieve this thickness. The coating may be formed or deposited on a first region at a first thickness, and on a second region with a second thickness. The coating thickness should preferably be selected to maintain the desired surface free energy while not adding excess material and weight to the fuel cell. The coating thickness is also a function of the coating morphology. As the mean thickness decreases to a certain threshold level, the film or coating may become discontinuous.

In various embodiments, a discontinuous layer of the resin coating is provided on regions of the electroconductive element. As used herein, the term "discontinuous coating" refers to a coating marked by intermittent breaks, interruptions, or discontinuities. For example, the coating may consist of a plurality of distinct or unconnected regions, or "islands," each comprising the same or similar ion-exchange resin. The discontinuous layer provides the beneficial effect of surface wettability, while leaving a sufficient non-coated area to facilitate the direct contact between the base plate material and carbon fibers that are disposed in the diffusion media, typically disposed adjacent the electroconductive element. Preferably, the islands are similarly spaced from one another, and any non-coated regions between the islands are sufficiently large relative to the size of the fibers of the diffusion media to facilitate electrical contact. An average diameter of the diffusion media fibers can generally range from about 5 to about 10 µm. Preferably, the non-coated distance between coated islands is at least the size of the individual carbon fibers, and is preferably up to about ten times larger than the fiber diameter, such as for example between about 10 and about 100 µm. It should be understood that the coating layer thickness and the distance between islands can be increased or decreased, depending on the design and selection of materials, and these variations are within the scope of the present invention.

The present invention also provides a fuel cell containing an impermeable electrically conductive element having an ion-exchange resin coating on one or more regions. The fuel cell includes an anode, a cathode, a proton exchange membrane disposed between the anode and cathode, and at least one impermeable, electrically conductive element defining a fluid flow field, wherein the flow field is adjacent to an MEA, gas diffusion media, or combination thereof. At least one area of the surface of the conductive element has the resin coating applied along a region of the flow field susceptible to liquid accumulation.

It is believed that a dual-nature resin coating allows better water management inside the flow field channels of a fuel cell. Several trials using hydrophilic coatings on composite bipolar plates have shown that fuel stacks do not have significant problems with water management, and hydrophilicity is indeed what is needed to help avoid water accumulation inside flow field channels. Ion-exchange resin coatings can be coated on composite bipolar plates with minimal, if any, stability concerns. Alternatively, a neutralized form of an ion-exchange resin can form a stable coating on metallic bipolar plates. When formed, the coating behaves initially as a substantially hydrophobic coating, and when it is fully humidified, the coating becomes substantially hydrophilic.

It is presently believed that the hydrophobic nature of the dry coating is preferred for a stack shutdown cycles, wherein the fuel cell has to be purged of as much water as possible for subsequent startup, especially under freezing conditions. As the plate material dries, the resin coating becomes relatively hydrophobic, thereby making it easier to purge small, residual water droplets that are left behind in the flow field channels. It is noteworthy to mention that the ion-exchange resin coatings behave similarly in nature to polymer electrolyte membranes (PEM); however, because of a coating thickness from about 0.01 to about 10 microns, the coating will generally take less time to become fully hydrated.

The resin coating reduces liquid accumulation on the region as fluid flows through the flow field, as compared to an uncoated region. Advantageously, the surface free energy of the coated bipolar plate can be adjusted by choosing different ion-exchange resins and different coating techniques. The surface free energy of the resin coating can be varied from as low as about 19 dynes/cm and up to about 72 dynes/cm.

In various embodiments, the resin coated bipolar plate described above is useful in a separator assembly in an electrochemical fuel cell that provides integrated water management. Such water management functions include: moving water away from the wet areas of the cathode side of the fuel cell, where it is generated as a product in the fuel cell electrochemical reaction; moving water away from the wet areas of the anode side of the fuel cell, where it can reside as a result of condensation of water from the reactant gas stream, or by transport of product water across the MEA; preventing water build up in any curves or bends in the flow field by reducing fluid accumulation; and more fully enabling the internal transportation of water to any relatively dry areas along the cathode side.

Figure 3:
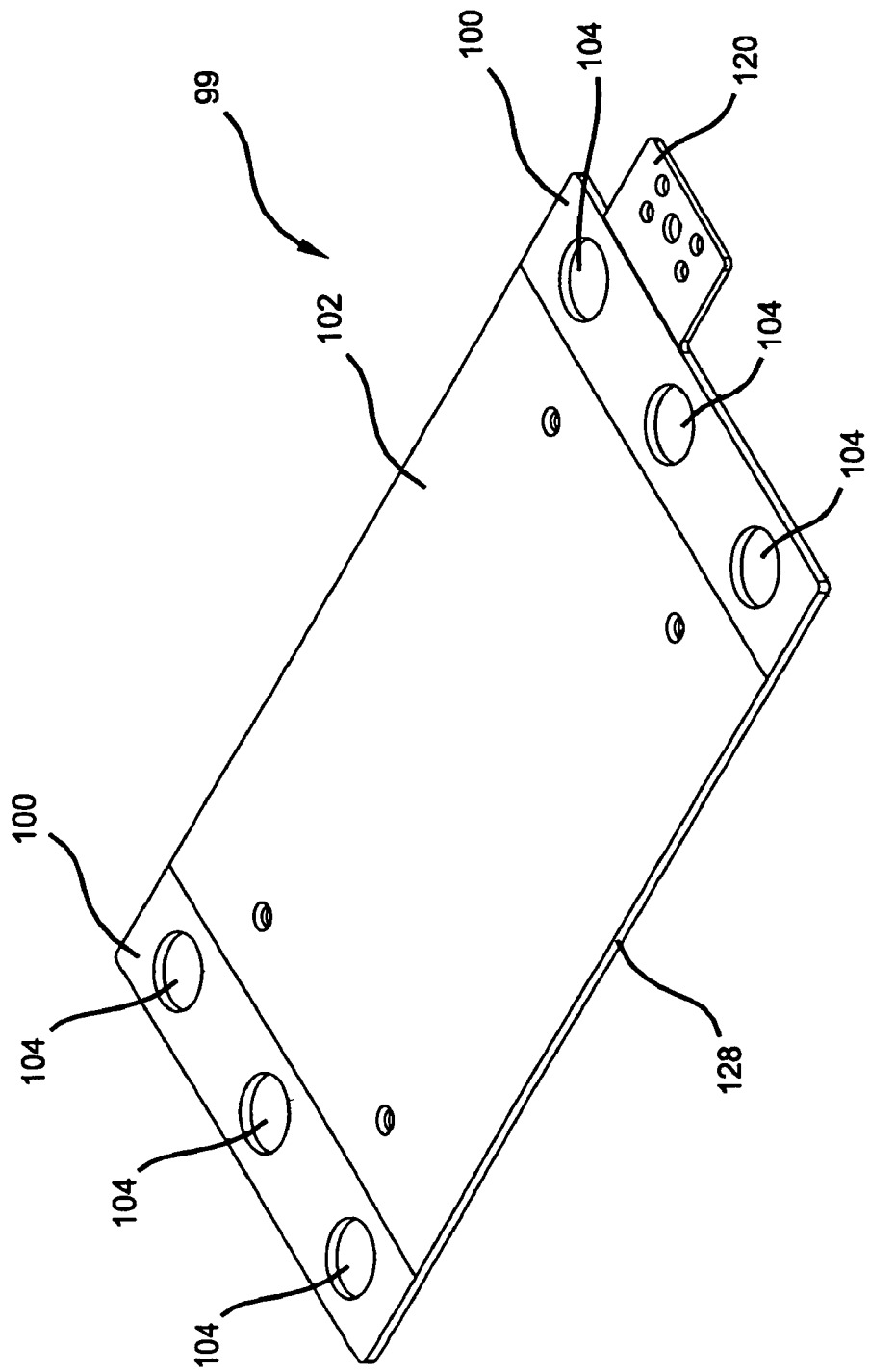
FIG. 3 is an exemplary terminal collector end plate according to an alternate embodiment of the present invention.

The resin coating of the present invention is also applicable to other conductive elements in a fuel cell which contact fluids, such as terminal collector end plates like the exemplary one shown in FIG. 3. A terminal collector end plate 99 (such as 10 or 12 of FIG. 1) has an electrically non-conductive region 100, as well as an electrically conductive region 102. In various embodiments, the resin coating of the present invention is applied to the conductive region 100, in whole or in part. The conductive regions 102 of the terminal plate 99 are typically separated from the non-conductive region 100 by sealing gaskets 33, 35 (FIG. 1). Apertures 104 within the non-conductive region 100 extend through the body, or substrate, 128 of the terminal plate 99 and permit fluid transport (e.g. $H_2$, $O_2$, coolant, anode and cathode effluent) both into and out of the stack during operating conditions. The particular quantity or sequence of the apertures 104 is not limiting, and is merely exemplary as described herein, as numerous configurations are possible as recognized by one of skill in the art. A bipolar plate flow field design dictates the inlet and outlet aperture 104 configurations and fluid delivery placement. An electrically conductive collector tab 120 can be attached to external leads, facilitating the external collection of current from the stack.

The present invention also provides to a method for managing the water accumulation of a fuel cell by manufacturing an electrically conductive element for use in an electrochemical fuel cell. The method comprises depositing an ion-exchange resin coating on at least one region of a flow field of an electrically conductive element. Various embodiments include dip coating or spraying the resin coating onto select regions of electrically conductive fuel cell elements. As previously described, it may be desirable to coat an entire surface of the element, while in various other embodiments, it may be desired to coat certain regions such as the flow channels and not the lands. In these situations, the coating applied to the element as a whole, and can be removed from certain areas using a secondary removal process, for example, by using mechanical means. Alternatively, certain regions of the element can be covered, or masked, prior to being coated using conventional means. Once coated, the masking is then removed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell electrically conductive element comprising:
a non-porous substrate having a surface constructed and arranged to distribute reactant gas, wherein at least one region of the surface comprises a discontinuous resin coating, the resin coating being substantially hydrophobic when dry and substantially hydrophilic when wet.

2. The electrically conductive element of claim 1, wherein the resin coating comprises an ion-exchange resin.

3. The electrically conductive element of claim 1, wherein the resin coating comprises a perfluorosulfonic acid polymer.

4. The electrically conductive element of claim 1, wherein the resin coating exhibits a static water contact angle less than about 45 degrees during conditions greater than 100% Local Relative Humidity.

5. The electrically conductive element of claim 1, wherein the resin coating exhibits a static water contact angle greater than about 90 degrees during conditions less than about 90% Local Relative Humidity.

6. The electrically conductive element of claim 1, wherein the resin coating has a thickness of from about 0.01 to about 10 μm.

7. The electrically conductive element of claim 1, wherein the resin coating comprises a first region having a first thickness and a second region having a second thickness different from the first thickness.

8. The electrically conductive element of claim 1, wherein the substrate comprises one of a composite material, metallic material, or both.

9. The electrically conductive element of claim 1, wherein the resin coating comprises a plurality of discontinuous regions spaced apart such that a distance between coated regions is on average from about 10 to about 100 μm.

10. A fuel cell comprising:
an anode;
a cathode;
a proton exchange membrane disposed between the anode and cathode; and
at least one non-porous flow field plate disposed adjacent to the anode or the cathode or both the anode and the cathode,
wherein the flow field plate comprises an ion-exchange resin coating having a plurality of discontinuous regions, the resin coating being substantially hydrophobic when dry and substantially hydrophilic when wet.

11. The fuel cell according to claim 10, wherein the resin coating has a thickness of from about 0.01 to about 10 μm.

12. The fuel cell according to claim 10, wherein the plurality of discontinuous regions are spaced apart such that a distance between coated regions is on average from about 10 to about 100 μm.

13. The fuel cell according to claim 10, further comprising a gas diffusion layer adjacent to at least one of the anode and cathode and comprising a fibrous material, wherein the plurality of discontinuous regions are spaced apart such that a distance between coated regions is from about 1 to about 10 times the size of an average fiber diameter of the fibrous material.

14. The fuel cell according to claim 10, wherein the resin coating comprises a perfluorosulfonic acid polymer.

* * * * *